UNITED STATES PATENT OFFICE.

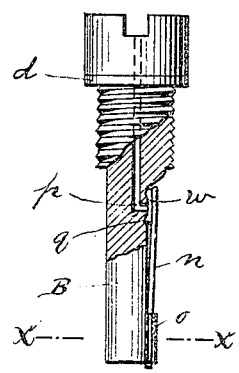
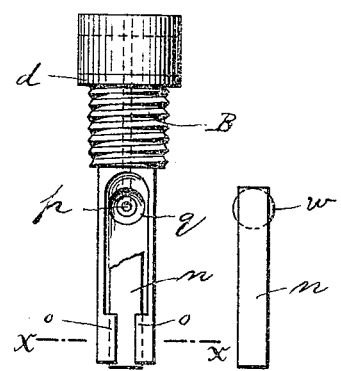
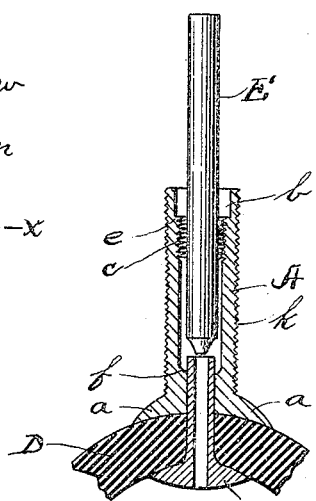
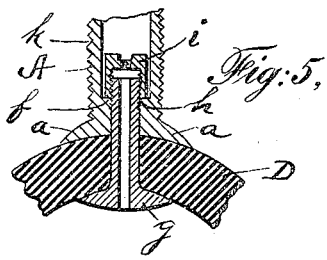
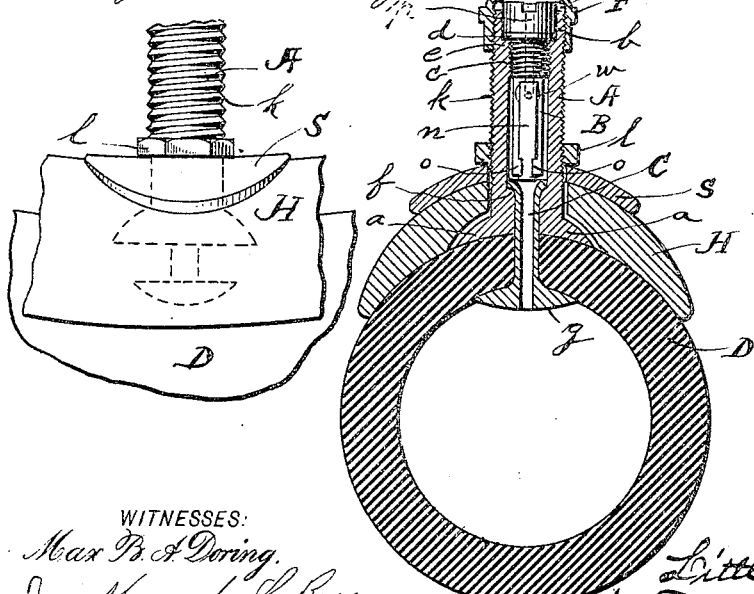

LITTLETON K. BUCK, OF FREEHOLD, NEW JERSEY.

PNEUMATIC-TIRE VALVE.

No. 801,209.	Specification of Letters Patent.	Patented Oct. 10, 1905.

Application filed December 12, 1904. Serial No. 236,473.

*To all whom it may concern:*

Be it known that I, LITTLETON K. BUCK, a citizen of the United States, residing at Freehold, in the county of Monmouth and State of New Jersey, have invented new and useful Improvements in Pneumatic-Tire Valves, of which the following is a specification.

My invention relates to pneumatic valves, and more particularly to valves for use on pneumatic tires for vehicles—automobiles, bicycles, and the like.

My invention is comprised in certain novel construction and combination of parts, which will hereinafter be more particularly described and definitely claimed; and the objects of my invention are to improve the efficiency and durability of such valves and to cheapen the cost of their manufacture as well as to overcome certain disadvantages hereinafter referred to.

Pneumatic valves have been made in which the means for securing in place in a pneumatic tire or other air-receptacle has been a rubber nipple expanded about the valve tube or stem and bound thereon usually with wire. Others have been made with a solid stem or valve-tube to extend through the wall of the tire and provided with a shoe on the end projected through on the inside or air-chamber of the tire and a broad thin clamp-nut to screw down on the external threaded surface of the stem to clamp the same to the wall of the tire. In the former, as is well known, the rubber nipple by aging and constant torsion becomes hard and cracks, rendering the same useless, and in the latter it has been found that owing to the impracticability of making the stem of small diameter too large a hole is necessary in the wall of the tire for entrance of the same, and thus a source of weakness develops there and air-leakage around the stem results.

My present invention obviates these difficulties, as will be hereinafter shown, and provides, furthermore, accessibility to the valve mechanism proper for ready repair and presents other useful and novel features.

In the drawings, Figures 1 and 2 are enlarged views of the valve mechanism proper removed from the valve stem or tube, the first being partly sectional. Figs. 3 and 5 show the valve-tube with the valve mechanism removed and illustrate means for securing the same in place on the tire. Fig. 4 is a vertical sectional view of my improved valve complete, assembled and in place on a tire. Fig. 6 is a side elevation illustrating a feature of my invention, and Fig. 7 is a cross-section on lines $x$ $x$ of Figs. 1 and 2.

Like letters indicate corresponding parts throughout the several figures.

A represents a metallic valve-tube, preferably having a flange $a$ at its lower end impinging the exterior surface of the tire and pierced its entire length, counterbored at $b$ and internally screw-threaded for a space at $c$ to receive the correspondingly screw-threaded part of the valve mechanism B. (Shown in place in Fig. 4.) This part B is provided with a washer of leather or other suitable material at $d$, so that when it is screwed down firmly it will make air-tight jointure with the counterbored shoulder $e$ in the tube.

The hole at the lower end of the tube is reduced in diameter to receive a button-headed tubular integrally-made fastening and clamping stud C, by which the valve is secured to the tire D. The preferred method of securing this stud is shown in Fig. 3, where by means of a cone-pointed tool E the upper end of the stud, which is made of ductile metal, is expanded and its margins turned over forcibly upon the counterbored or internal shoulder $f$, near the lower (or flanged) end of the valve-tube, and thus also causes the wall of the tire G to be tightly compressed between the button-head $g$ of the stud and the lower end or the flange $a$ of the valve-tube, making a firm air-tight fastening. A modified means of securing this stud is shown in Fig. 5, where the upper end of the latter is screw-threaded at $h$, and a screw-threaded nut $i$, slotted or otherwise adapted to be turned, is screwed down firmly against the shoulder $f$, drawing the button-head $g$ firmly up against the interior of the tire, compressing the latter against the lower end or the flange $a$ of the valve-tube. By the use of this tubular button-headed stud for securing the valve-tube to the outer surface of the tire it will be seen that but a small aperture-space is taken in the tire-wall for entrance and shank of the stud.

The exterior $k$ of the valve-tube A is screw-threaded above the flange to receive a reducer-nipple F and a nut $l$, the latter being screwed down against a semicylindrical conformed rim-strengthening shield S, said shield resting on and reinforcing the wood rim H. The nipple, which is internally screw-threaded for attachment of the air-pump, is provided with a screw-threaded protecting-plug $m$. It will be understood by those skilled in the art that the rim-strengthening shield S serves a further purpose besides that of strengthening the rim itself in that it provides, by having a large frictional contact with the rim, against creeping of the tire to which the valve is attached.

The valve mechanism is composed of a piece of metallic rod (usually brass) reduced to three diameters, the first or larger diameter being the head, which is slotted to receive a screwdriver or otherwise adapted to be turned. The second is a screw-threaded portion, and the third, being flattened along one side, has a short bit of leaf-spring $n$, secured at its lower end to the same, preferably by turning the metal down upon its margins at $o$ $o$, and to the other end of the spring on the side next to and directly opposite an air-passage $p$ a disk $w$, of leather, rubber, or other suitable material, is cemented or secured for closing this air-passage $p$, all which constitutes a known device; but around this air-passage at $q$ (see Figs. 1 and 2) I construct my improved valve with a groove to further insure air-tight contact or seating of the valve-disk $w$, and this construction constitutes a feature of my present invention.

The operation of my invention for the principal part will be clearly understood from the foregoing description by those skilled in the art without further explanation. However, it should be noted that when it is desired to deflate the tire the nipple F, together with plug $m$, is removed, and the part B need then only be unscrewed one or two turns, or less, to allow the air to escape through the mesh of the threads and from under the washer-packing $d$. Consequently there is no liability of the valve mechanism getting lost as it is not removed and cannot blow out. When the tire is to be inflated, this part B is screwed down firmly and the nipple F, which is packed at $u$ with an air-sealing washer, is firmly screwed down also. Then the nipple-protecting plug $m$ is removed and the pump-tube screwed in in place of it.

In some cases the flange $a$ and the rim-strengthening shield S with the nut $l$ may be dispensed with, so that a common rubber or mushroom stem may be expanded over the valve-stem A and cemented to the outer surface of the tire without affecting the valve or advantages of the remaining features of my invention.

Having described my invention, what I claim as new, and desire to secure by Letters Patent, is—

1. In a pneumatic valve, a counterbored valve-tube, inclosing an operative valve mechanism, and provided with an integral flange at its lower end to impinge upon the exterior surface of the tire or other object to be inflated, in combination with an integral button-headed tubular securing-stud adapted to be, by suitable appliances, entered directly through the tire or other object to be inflated, and firmly secured in the reduced bore of the flanged lower end of the valve-tube, and with its button-head to firmly impinge the interior surface of the tire or other object to be inflated.

2. In a pneumatic valve, a counterbored valve-tube, inclosing an operative valve mechanism, having its lower end impinged upon the exterior surface of the tire or other object to be inflated, in combination with an integral button-headed tubular securing-stud adapted to be, by suitable appliances, entered through the tire or other object to be inflated, and firmly secured in the bore of the lower end of the valve-tube, and with its button-head to firmly impinge the interior surface of the tire or other object to be inflated.

3. In a pneumatic valve, a valve-tube inclosing an operative valve mechanism, constructed with a groove around the inner end of the air-orifice, in combination with an integral button-headed tubular securing-stud adapted to be, by suitable appliances, entered through the tire or other object to be inflated, and firmly secured in the bore of the lower end of the valve-tube, and with the wall of the tire, or other object to be inflated, firmly impinged between the lower end of the valve-tube and the button-head of the stud.

In testimony whereof I have signed my name to this specification in the presence of two subscribing witnesses.

LITTLETON K. BUCK.

Witnesses:
CHAS. TENEX,
JOHN H. BOURNE.